(12) United States Patent
Kong et al.

(10) Patent No.: US 10,037,160 B2
(45) Date of Patent: Jul. 31, 2018

(54) STORAGE DEVICE DYNAMICALLY ALLOCATING PROGRAM AREA AND PROGRAM METHOD THEREOF

(71) Applicant: SAMSUNG ELECTRONICS CO., LTD., Suwon-si, Gyeonggi-Do (KR)

(72) Inventors: Chun-Um Kong, Seoul (KR); Kyu-Hyung Kim, Suwon-si (KR); Younwon Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 275 days.

(21) Appl. No.: 14/965,521

(22) Filed: Dec. 10, 2015

(65) Prior Publication Data

US 2016/0179430 A1 Jun. 23, 2016

(30) Foreign Application Priority Data

Dec. 19, 2014 (KR) ........................ 10-2014-0184466

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/064* (2013.01); *G06F 3/0679* (2013.01); *G06F 12/0246* (2013.01); *G06F 3/0616* (2013.01); *G06F 2212/1032* (2013.01); *G06F 2212/7201* (2013.01); *G06F 2212/7211* (2013.01)

(58) Field of Classification Search
CPC ...... G06F 3/0631; G06F 3/0604; G06F 3/064; G06F 3/0679; G06F 12/0246; G06F 3/0616; G06F 2212/1032; G06F 2212/7201; G06F 2212/7211
See application file for complete search history.

(56) References Cited

U.S. PATENT DOCUMENTS

| | | | |
|---|---|---|---|
| 7,676,626 B2 | 3/2010 | Lee et al. |
| 7,679,133 B2 | 3/2010 | Son et al. |
| 8,031,522 B2 | 10/2011 | Jang et al. |
| 8,045,377 B2 | 10/2011 | Kim |
| 8,335,886 B2 | 12/2012 | Lee |
| 8,402,243 B2 | 3/2013 | Wakrat et al. |
| 8,407,400 B2 | 3/2013 | Marotta et al. |
| 8,521,945 B2 | 8/2013 | Tan et al. |
| 8,553,466 B2 | 10/2013 | Han et al. |
| 8,559,235 B2 | 10/2013 | Yoon et al. |

(Continued)

FOREIGN PATENT DOCUMENTS

KR 1020130050586 A 5/2013

*Primary Examiner* — Eric Cardwell
(74) *Attorney, Agent, or Firm* — Volentine, Whitt & Francos, PLLC

(57) ABSTRACT

A storage device includes a nonvolatile memory device including memory blocks divided into a first memory area and a second memory area; and a memory controller. In the case of programming specific attribute data, the memory controller determines a memory area in which the specific attribute data will be programmed according to a wear out ratio of the first memory area and a wear out ratio of the second memory area. The wear out ratio is a ratio of the current maximum erase count of memory blocks of a memory area with respect to the allowable maximum erase count of the memory area.

12 Claims, 11 Drawing Sheets

(56) References Cited

U.S. PATENT DOCUMENTS

| | | |
|---|---|---|
| 8,654,587 B2 | 2/2014 | Yoon et al. |
| 8,687,420 B2 | 4/2014 | Shibata et al. |
| 8,762,622 B2 | 6/2014 | Moshayedi et al. |
| 2011/0233648 A1 | 9/2011 | Seol et al. |
| 2011/0271043 A1 | 11/2011 | Segal et al. |
| 2012/0191900 A1 | 7/2012 | Kunimatsu et al. |
| 2012/0246391 A1 | 9/2012 | Meir et al. |
| 2013/0046920 A1 | 2/2013 | Ryu et al. |
| 2013/0173844 A1* | 7/2013 | Chen .................. G06F 12/0246 711/103 |
| 2013/0346676 A1* | 12/2013 | Kim .................... G06F 12/0246 711/103 |

* cited by examiner

STORAGE DEVICE DYNAMICALLY ALLOCATING PROGRAM AREA AND PROGRAM METHOD THEREOF

CROSS-REFERENCE TO RELATED APPLICATION

A claim for priority under 35 U.S.C. § 119 is made to Korean Patent Application No. 10-2014-0184466, filed on Dec. 19, 2014, in the Korean Intellectual Property Office, the entire contents of which are hereby incorporated by reference.

BACKGROUND

The inventive concepts described herein relate to a storage device, and more particularly, to a storage device in which data is dynamically allocated to be programmed in memory areas, and a program method thereof.

Portable electronic devices such as digital cameras, MP3 players, cellular phones, PDAs, and the like are currently widely used. Flash memory is a nonvolatile memory device and is mainly used in such portable devices because of its low power and high integration characteristics.

Flash memory however has a problem that a write operation unit is not identical to a read operation unit. To solve this problem, software such as a flash translation layer (FTL) which includes an address mapping function is used. The FTL receives a logical address from a host, and translates the received logical address into a physical address. The physical address is the address actually used to access the flash memory.

The FTL stores write data transmitted from a host or internal data in a memory block of the memory device. In particular, in the case that reliability of data is important, such as in the case of meta data, the FTL stores the data in memory blocks having high reliability. The remaining data excluding the meta data is typically stored in memory blocks that have comparatively low reliability, but which can store more data per unit cell. That is, the memory blocks are typically separated and used under different management methods. For instance, the flash memory may include memory blocks managed using a single level cell (SLC) method and memory blocks managed using a multi level cell (MLC) method.

In the case of using memory blocks according to different management methods such as SLC and MLC managing methods, a difference in the lifespan of the memory blocks may occur due to the different management methods. Although the lifespan of memory blocks of a memory device managed using an SLC method may be long enough, the lifespan of memory blocks of the memory device managed using an MLC method may however expire. As a result, the lifespan of the storage device as a whole will expire. That is, a lifespan condition required for a storage device may not be satisfied.

SUMMARY

Embodiments of the inventive concept provide a storage device including a nonvolatile memory device including memory blocks divided into a first memory area and a second memory area; and a memory controller. The memory controller is configured to determine in which of the first and second memory areas to program specific attribute data according to a wear out ratio of the first memory area and a wear out ratio of the second memory area. The wear out ratio of a memory area is a ratio of a current maximum erase count of memory blocks of the memory area with respect to an allowable maximum erase count of the memory area.

Embodiments of the inventive concept also provide a program method of a nonvolatile memory device including memory blocks divided into a meta area and a user area. The program method includes calculating a wear out ratio of the meta area and a wear out ratio of the user area; and determining an area among the meta area and the user area in which to program specific attribute data according to the calculated wear out ratios of the meta area and the user area. The wear out ratio of an area is a ratio of a current maximum erase count of memory blocks of the area with respect to an allowable maximum erase count of the area.

Embodiments of the inventive concept also provide a storage device including a nonvolatile memory device including memory blocks divided into a first memory area and a second memory area; and a memory controller. The memory controller is configured to count erase operations performed to determine erase counts of the memory blocks, calculate a wear out ratio of the first memory area and a wear out ratio of the second memory area based on the erase counts, and alternately program specific attribute data in the first and second memory areas based on the calculated wear out ratios.

BRIEF DESCRIPTION OF THE DRAWINGS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF EMBODIMENTS

Figure 1:
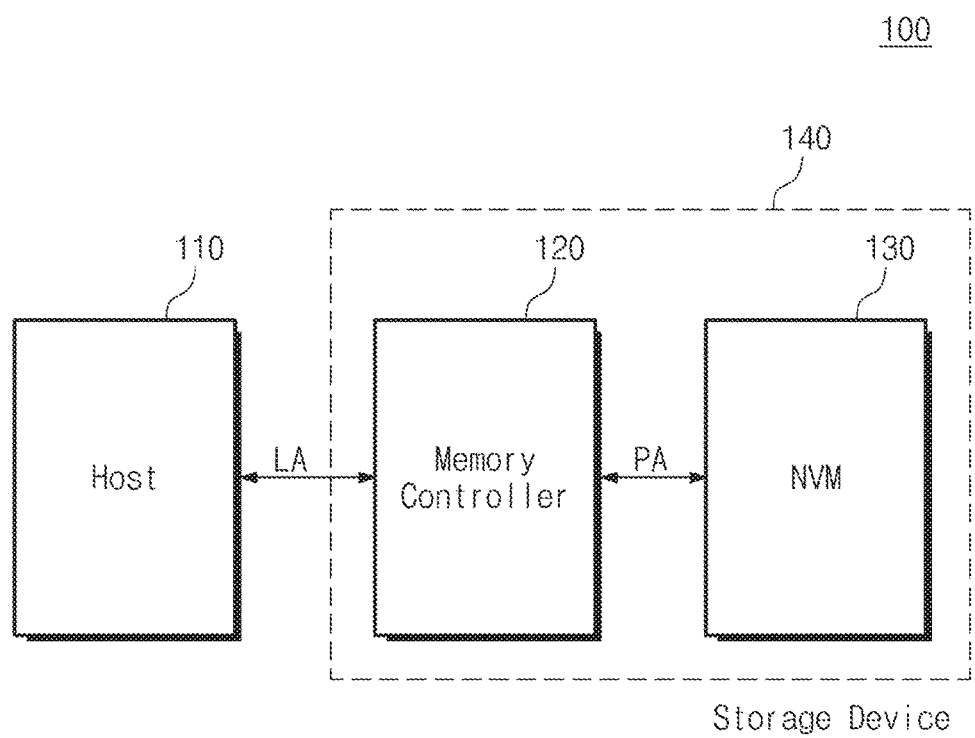
FIG. 1 is a block diagram illustrating a user device, according to embodiments of the inventive concept.

The inventive concept will be described more fully hereinafter with reference to the accompanying drawings, in which embodiments of the inventive concept are shown. The inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

A flash memory device is used as a nonvolatile storage medium for explaining characteristics and functions of the inventive concept as an illustration. However, those of ordinary skill in the art may easily understand other advantages and performance of the inventive concept according to the contents described here. Different nonvolatile memory devices may be used as a storage medium. For example, phase-change RAMs (PRAMs), ferroelectric RAMs (FRAMs), magnetoresistive RAMs (MRAMs), resistive RAMs (ReRAMs), ferroelectric RAMs (FRAMs), NOR flash memory, or the like may be used as a storage medium, and a memory system in which different kinds of memory devices are mixed may be used as the storage medium.

FIG. 1 is a block diagram illustrating a user device, according to embodiments of the inventive concept. A user device 100 includes a host 110 and a storage device 140. The storage device 140 includes a memory controller 120 and a nonvolatile memory device 130.

Responsive to a write request, the host 110 transmits write data (not shown) and a logical address (LA) to the storage device 140. The host 110 may include, for example, portable electronic devices such as a personal computer, a PDA, a MP3 player, or the like, and a HDTV.

The memory controller 120 interfaces the host 110 with the nonvolatile memory device 130. The memory controller 120 writes data provided from the host 110 in the nonvolatile memory device 130 in response to a write command. The memory controller 120 controls a read operation of the nonvolatile memory device 130 in response to a read command from the host 110. The memory controller 120 performs background operations such as wear leveling, garbage collection and bad block managing with respect to the nonvolatile memory device 130.

The memory controller 120 stores write data provided from the host 110 in memory blocks of the nonvolatile memory device 130. The write data may be divided into sequential data and random data according to a write pattern. The memory controller 120 stores not only data provided from the host 110, but also write data generated by a management operation of the nonvolatile memory device 130 in a memory block of the nonvolatile memory device 130. The write data generated by a management operation may include meta data, least significant bit (LSB) back data and garbage collection data. The sequential (continuous) data, the meta data, the LSB back data and the garbage collection data described above are designated as controller write data. The controller write data is a set of data having specific properties.

The memory controller 120 stores the controller write data in memory blocks of the nonvolatile memory device 130. The nonvolatile memory device 130 may be divided into a first memory area and a second memory area. Each memory area is constituted by a plurality of memory blocks. The first and second memory areas may be managed using different methods. For instance, the first memory area may be managed using a single level cell (SLC) method, and the second memory area may be managed using a multi level cell (MLC) method. A part of the controller write data may be programmed in the first memory area and the remaining part of the controller write data may be programmed in the second memory area. For example, meta data may be programmed in the first memory area and the remaining controller write data excluding the meta data may be programmed in the second memory area. That is, the controller write data may be programmed respectively in memory areas previously set.

In general, memory blocks managed using the SLC method have high endurance and high data reliability compared with memory blocks managed using the MLC method. Thus, meta data that is frequently programmed and reliability of which is important may be programmed in the first memory area, and the remaining controller write data may be programmed in the second memory area. In this case, due to an endurance difference between the first memory area and the second memory area, the lifespan of one of the first and second memory areas may expire first before the other. Thus, although the lifespan of the remaining memory area may not expire, the lifespan of the nonvolatile memory device 130 as a whole will expire. That is, the nonvolatile memory device may be deemed as no longer usable. However, according to embodiments of the inventive concept, the lifespan of the first and second memory areas expire at nearly the same time by alternately programming specific attribute data in the first and second memory areas. To achieve this, embodiments of the inventive concept use a wear out ratio, which represents a wear level of each memory area as a ratio. Thus, a wear level by an endurance difference of each memory area may be compared based on the same criterion.

The memory controller 120 determines a memory area in which specific attribute data will be programmed before programming specific attribute data. The memory controller 120 may program meta data from among the controller write data in the first memory area of the nonvolatile memory device 130, and program the remaining controller write data in the second memory area of the nonvolatile memory device 130. The memory controller 120 determines a memory area in which data of predetermined specific property will be programmed according to a wear out ratio of the memory area. The wear out ratio may be a ratio of an erase count of memory blocks of corresponding memory area with respect to endurance of each memory area.

The memory controller 120 may include software called a flash translation layer (FTL). The FTL provides an interface for hiding a delete operation of the nonvolatile memory device 130 between a file system of the host 110 and the nonvolatile memory device 130. The FTL as used with nonvolatile memory device 130 can alleviate disadvantages associated with erase-before-write operations and discrepancy between an erase unit and a write unit. The FTL, in a write operation of the nonvolatile memory device 130, can map a logical address LA generated by a file system to a physical address PA of the nonvolatile memory device 130.

The nonvolatile memory device 130 is provided as a storage medium of a storage device. For example, the nonvolatile memory device 130 may be constituted by a NAND type flash memory having a large storage capacity.

In this case, the nonvolatile memory device 130 may include memory areas managed using different methods. Each memory area includes a plurality of memory blocks. The nonvolatile memory device 130 may be constituted by a next generation nonvolatile memory such as PRAMs, MRAMs, ReRAMs, FRAMs, or the like, or NOR type flash memory. At least some of the nonvolatile memory devices 130 may be constituted by dynamic RAMs (DRAMs) or static RAMs (SRAMs).

In embodiments of the inventive concept, a three dimensional (3D) memory array may be provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In embodiments of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure as the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to embodiments of the inventive concept, when programming specific attribute data in the nonvolatile memory device 130, the storage device of the inventive concept determines a memory area in which the specific attribute data will be programmed, considering a wear out ratio of each memory area. In the case of programming specific attribute data, the memory controller 120 calculates a wear out ratio of each memory area to compare the calculated wear out ratios, and determines a memory area in which the specific attribute data will be programmed according to the comparison result. That is, the lifespan of each memory area may expire at nearly the same time by alternately programming the specific attribute data according to a wear out ratio. Also, the lifespan of the nonvolatile memory device 130 may increase compared with a case of programming the specific attribute data only in one designated program area. Specific attribute data that alternately will be programmed may be previously set depending on a use environment. In this case, the lifespan of the nonvolatile memory device 130 may further increase by setting the specific attribute data, considering the amount of use of the controller write data and frequency of use of the controller write data. The specific attribute data may be any one of the sequential data, the random data, the garbage collection data and the LSB backup data.

Figure 2:
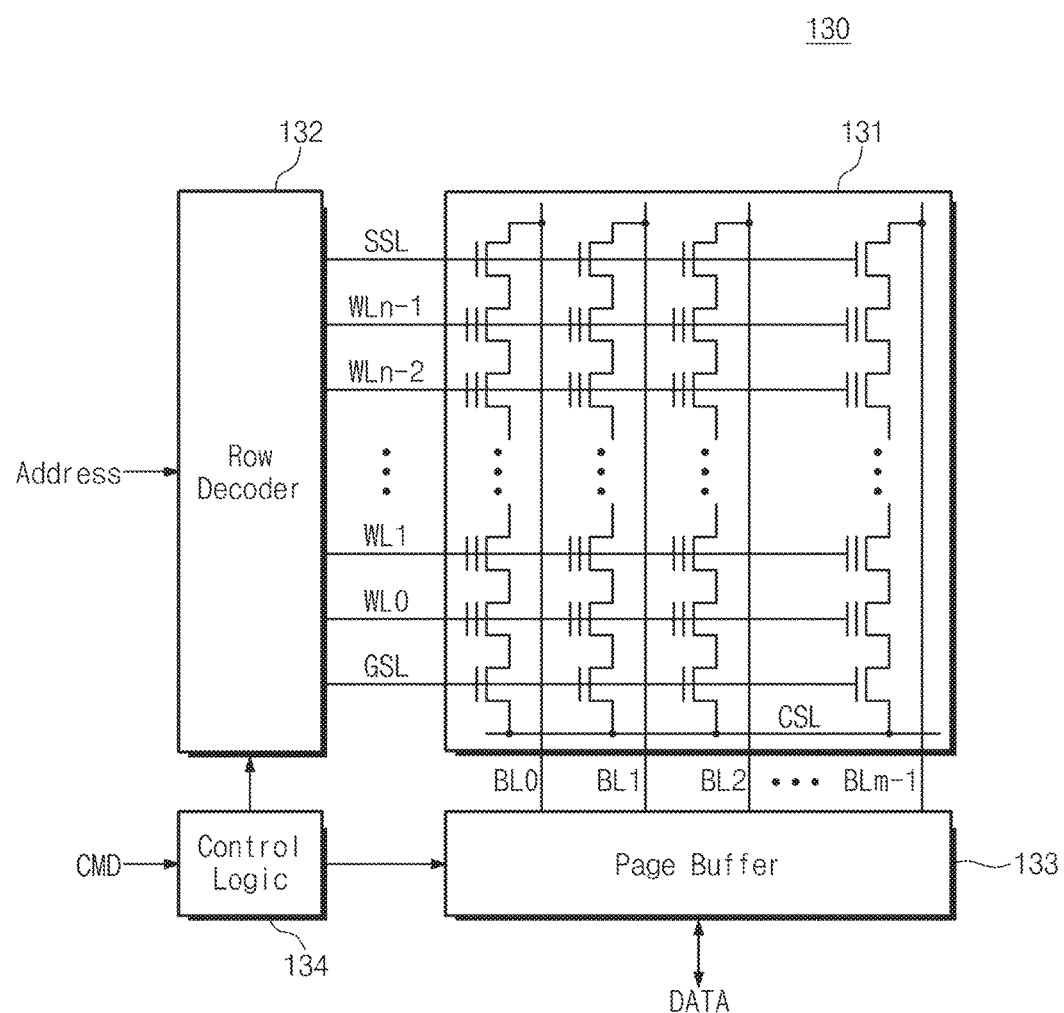
FIG. 2 is a block diagram illustrating an example of a nonvolatile memory device of FIG. 1.

FIG. 2 is a block diagram illustrating an example of a nonvolatile memory device of FIG. 1. Referring to FIG. 2, the nonvolatile memory device 130 includes a cell array 131, a row decoder 132, a page buffer 133 and control logic 134.

The cell array 131 may include a plurality of memory blocks. For convenience of explanation, in FIG. 2, the memory cell array 131 including one memory block is illustrated. Each memory block may include a plurality of pages. Each page may include a plurality of memory cells. In the nonvolatile memory device 130, an erase operation may be performed by a memory block unit and a write or read operation may be performed by a page unit.

The cell array 131 includes a plurality of memory cells. Memory cells may be configured in cell string structures. A cell string includes a string select transistor SST connected to a string select line SSL, a plurality of memory cells connected to a plurality of word lines WL0~WLn-1 and a ground select transistor GST connected to a ground select line GSL. The string select transistor SST is connected to a bit line BL and the ground select transistor GST is connected to a common source line CSL.

The cell array 131 may include a substrate and a plurality of cell strings vertically formed on the substrate. Each cell string may include a plurality of cell transistors stacked in a direction perpendicular to the substrate. That is, the cell array 131 may be formed to have a three-dimensional structure (or a vertical structure).

The row decoder 132 is connected to the cell array 131 through the string select line SSL, the ground select line GSL or word lines WL0~WLn-1. In a program or read operation, the row decoder 132 receives an address to select any one word line (e.g., WL1). The row decoder 132 transmits a voltage necessary for a program or read operation to a select word line or an unselect word line.

The page buffer 133 operates as a write driver or a sense amplifier. The page buffer 133 can temporarily store data to be programmed in selected memory cells or data read from the selected memory cells. The page buffer 133 is connected to the cell transistor 131 through bit lines BL0~BLm-1. In a program operation, the page buffer 133 receives data, and transmits the received data to memory cells of the selected page. In a read operation, the page buffer 133 reads data from memory cells of the selected page and outputs the read data to the outside.

The control logic 134 controls program, read and erase operations of the nonvolatile memory device 130. For example, in a program operation, the control logic 134 can control the row decoder 132 so that a program voltage is provided to a selected word line. The control logic 134 can control the page buffer 133 so that program data is provided to a selected page.

Figure 3:
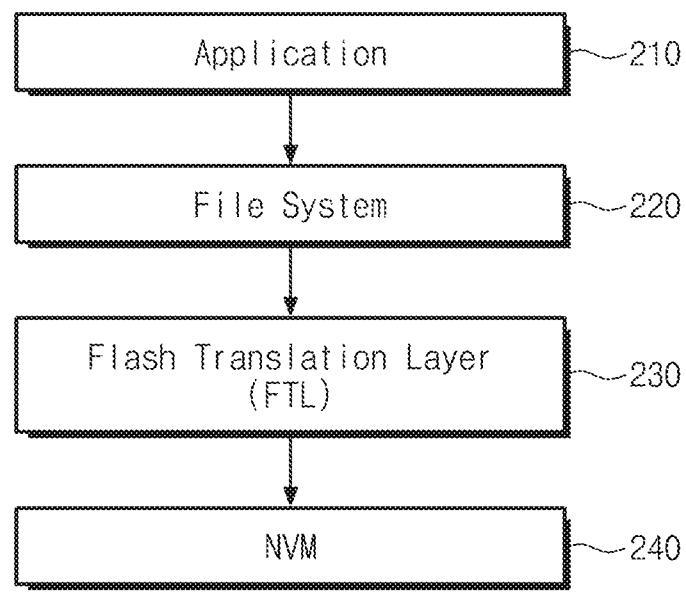
FIG. 3 is a block diagram illustrating a software hierarchical structure for driving a storage device of FIG. 1.

FIG. 3 is a block diagram illustrating a software hierarchical structure for driving a storage device of FIG. 1. Referring to FIG. 3, a flash translation layer 230 translates a logical address (for example, a sector address and the number of sectors) transmitted from a file system 220 into a physical address PA.

The flash translation layer 230 may include an address mapping table to map a physical address PA of a nonvolatile memory device 240. A location at which the flash translation layer 230 is driven may be inside the memory controller 120 (refer to FIG. 1). Functions of the flash translation layer 230 may be distributed in the host 110 and the memory controller 120 to be performed.

There may be several address mapping methods of the flash translation layer 230 depending on a mapping unit. Typical examples of the address mapping methods may include a page mapping method, a block mapping method and a hybrid mapping method.

The flash translation layer 230 performs a program operation of writing controller write data in memory blocks of the nonvolatile memory device 240. The flash translation layer 230 determines a memory area in which specific attribute data from among the controller write data is programmed, considering a wear out ratio of a memory area. The wear out ratio is a ratio of the current maximum erase count of memory blocks with respect to endurance of each memory. The endurance may be the allowable maximum erase count of each memory area. The wear out ratio is used to compare the wear out level of each memory area having different endurance based on the same criterion. The lifespan of each memory area can expire at nearly the same time by comparing the wear out level of each memory area based on the same criterion to determine a memory area in which specific attribute data is programmed.

Figure 4:
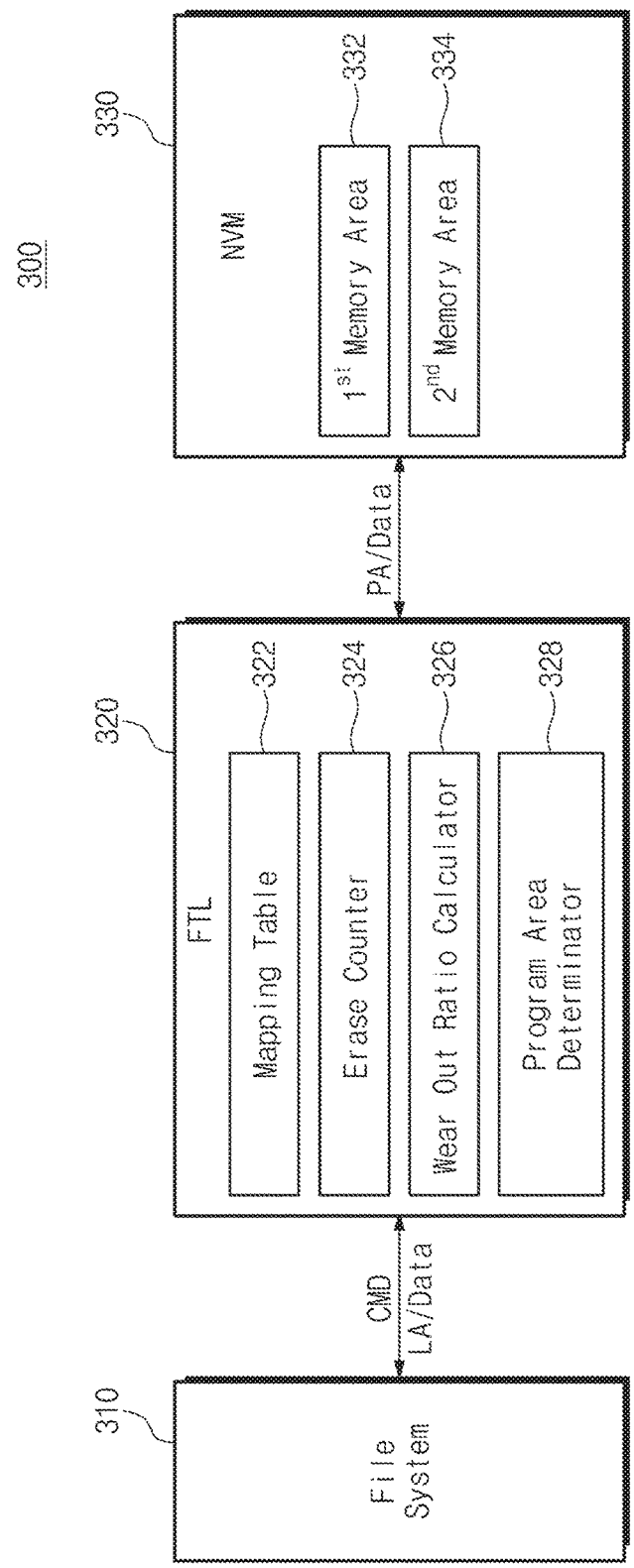
FIG. 4 is a block diagram illustrating a software hierarchy of a storage device of FIG. 1 in detail.

FIG. 4 is a block diagram illustrating a software hierarchy of a storage device of FIG. 1 in detail. Referring to FIG. 4, a storage device 300 includes a file system 310, a flash translation layer 320 and a nonvolatile memory device 330. The flash translation layer 320 receives a write command CMD, write data and a logical address LA from the file system 310. The flash translation layer 320 translates a logical address LA into a physical address PA, using the mapping table 322.

The flash translation layer 320 includes a module such as a mapping table 322, an erase counter 324, a wear out ratio calculator 326 and a program area determinator 328. The flash translation layer 320 translates a logical block number LBN into a physical block number PBN, using the mapping table 322.

The erase counter 324 counts an erase count of memory blocks constituting memory areas 332 and 334 of the nonvolatile memory device 330.

The wear out ratio calculator 326 calculates a wear out ratio of the first memory area 332 and the second memory area 334, using the following formula:

wear out ratio=(the current maximum erase count of memory blocks of a memory area)/ (the allowable maximum erase count of a memory area)

The maximum erase count is the greatest erase count among erase counts of memory blocks of a memory area at the time when calculating a wear out ratio. The allowable maximum erase count of a memory area means an allowable count of a memory area within the limit of assuring reliability of an operation. The allowable maximum erase count of a memory area may become different depending on the type of memory cell constituting a memory area. If the first memory area 332 in FIG. 4 is constituted by memory cells of SLC type and the second memory area 334 is constituted by memory cells of MLC type, the allowable maximum erase count of the first memory area 332 is greater than the allowable maximum erase count of the second memory area 334. A detailed calculation method of a wear out ratio will be described later with reference to FIG. 5.

In the case of using a wear out ratio according to embodiments of the inventive concept, the remaining lifespan (wear level) of the first and second memory areas 332 and 334 of nonvolatile memory device 330 having different allowable maximum erase counts from each other can be compared based on the same criterion. If a wear out ratio of the first memory area 332 is greater than a wear out ratio of the second memory area 334, it means that the first memory area 332 is worn down more than the second memory area 334. Thus, the memory controller 120 (refer to FIG. 1) can program specific attribute data in the second memory area 334 which is relatively less worn down.

The program area determinator 328 determines a memory area in which specific attribute data is programmed by comparing a wear out ratio of each memory area calculated by the wear out ratio calculator 326. If a wear out ratio of the first memory area 332 is smaller than a wear out ratio of the second memory area 334, the program area determinator 328 can determine the first memory area 332 as a memory area in which specific attribute data is programmed. If a wear out ratio of the first memory area 332 is equal to or greater than a wear out ratio of the second memory area 334, the program area determinator 328 can determine the second memory area 334 as a memory area in which specific attribute data is programmed.

The nonvolatile memory device 330 may include the first memory area 332 and the second memory area 334. The first memory area 332 and the second memory area 334 may be managed using different methods from each other. For instance, the first memory area 332 may be managed using an SLC method and the second memory area 334 may be managed using an MLC method. Also, in other embodiments of the inventive concept, the first memory area 332 may be managed using an SLC method and the second memory area 334 may be managed using a triple level cell (TLC) method.

Meta data may be stored in the first memory area 332. The second memory area 334 may store continuous data, random data, LSB (least significant bit) back up data and garbage collection data. Any one of the continuous data, the random data, the LSB (least significant bit) back up data and the garbage collection data may be alternately stored in the first and second memory areas 332 and 334 of the nonvolatile memory device 330.

In the flash translation layer 320, specific attribute data is alternately programmed in the first and second memory areas 332 and 334 so that the nonvolatile memory device 330 may be used for the entirety of the intended lifespan required. The flash translation layer 320 uses a wear out ratio representing a wear level of each memory area. The flash translation layer 320 determines a memory area in which specific attribute data is programmed by comparing a wear out ratio of each memory area.

For this, the above described operation modules included in the flash translation layer 320 is used. The program area determinator 328 may determine a memory area in which specific attribute data is programmed according to a wear out ratio calculated using the allowable maximum erase count of each memory area and the maximum erase count of memory blocks. In the case of programming specific attribute data, the flash translation layer 320 determines a memory area in which the specific attribute data is programmed according to a wear out ratio. Consequently, according to a wear out ratio, the specific attribute data may be alternately programmed in the first memory area 332 and the second memory area 334.

Figure 5:
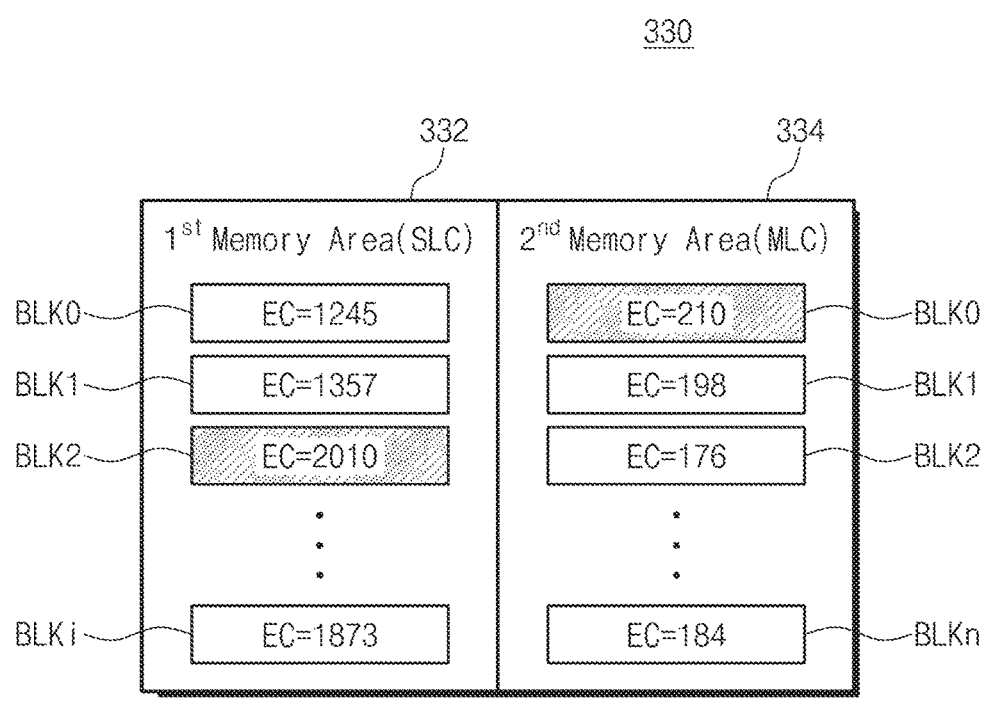
FIG. 5 illustrates a nonvolatile memory device of FIG. 4 explanatory of a calculation method of a wear out ratio, according to an embodiment of the inventive concept.

FIG. 5 illustrates a nonvolatile memory device of FIG. 4 explanatory of a calculation method of a wear out ratio, according to an embodiment of the inventive concept. Referring to FIG. 5, the nonvolatile memory device 330 includes the first memory area 332 and the second memory area 334. The first memory area 332 includes a plurality of memory blocks BLK0, BLK1, BLK2, . . . , BLKi. The second memory block 334 includes a plurality of memory blocks BLK0, BLK1, BLK2, . . . , BLKn. The memory blocks BLK0, BLK1, BLK2, . . . , BLKi of the first memory area 332 are constituted by memory cells of SLC type which are managed using an SLC method. The memory blocks BLK0, BLK1, BLK2, . . . , BLKn of the second memory area 334 are constituted by memory cells of MLC type which are managed using an MLC method.

The erase counter 324 of the flash translation layer 320 counts an erase count EC of each memory block of a memory area. As a count result of counting, the maximum erase count of the first memory area 332 is 2010 which is an erase count of the memory block BLK2, and the maximum erase count of the second memory area 334 is 210 which is an erase count of the memory block BLK0.

The wear out ratio calculator 326 calculates a wear out ratio of each memory area, using the maximum erase count of each memory area and the allowable maximum erase count of each memory area. The first memory area 332 may be managed using an SLC method and the second memory area 334 may be managed an MLC method. Thus, the allowable maximum erase count of the first memory area 332 may be different from the allowable maximum erase count of the second memory area 334. Assuming as an example that the allowable maximum erase count of the first memory area 332 is 10000 and the allowable maximum erase count of the second memory area 334 is 1000, in this case a wear out ratio of the first memory area 332 is 2010/10000 and a wear out ratio of the second memory area 334 is 210/1000.

The program area determinator 328 compares a wear out ratio of the first memory area 332 with a wear out ratio of the second memory area 334. As a result, the program area determinator 328 determines a memory area having a smaller wear out ratio as a memory area in which specific attribute data is programmed. In the example described with respect to FIG. 5, a wear out ratio of the second memory area 334 is greater than a wear out ratio of the first memory area 332. Thus, the program area determinator 338 determines the first memory area 332 as a memory area in which specific attribute data is programmed.

Figure 6:
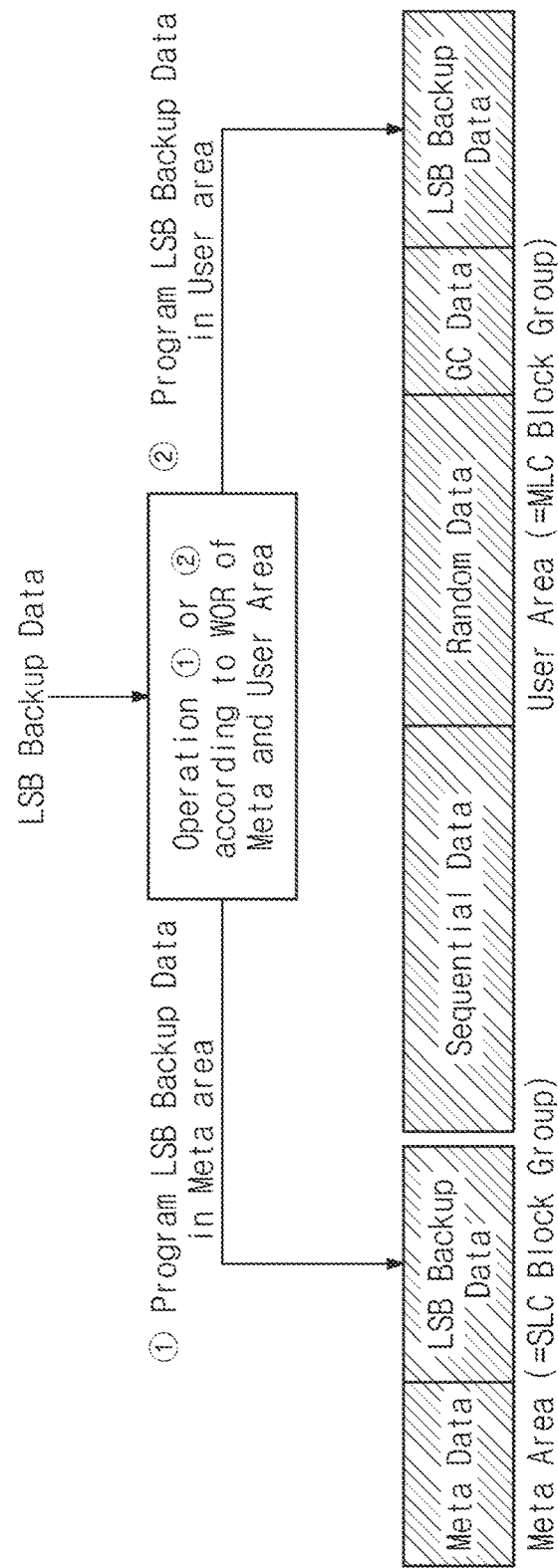
FIG. 6 illustrates a program area allocation method, according to an embodiment of the inventive concept.

FIG. 6 illustrates a program area allocation method, according to an embodiment of the inventive concept. Referring to FIG. 6, it can be checked that LSB backup data is alternately programmed as specific attribute data in a corresponding memory area according to a wear out ratio of a memory area.

The nonvolatile memory device 130 (refer to FIG. 1) may include a meta area and a user area that include a plurality of memory blocks. The meta area may be constituted by memory blocks of SLC type managed using an SLC method and having high reliability. The user area may be constituted by memory blocks of MLC type managed using an MLC method and having relatively low reliability compared with the SLC method, but which are capable of storing more data per memory cell.

Meta data is programmed in the meta area. Since reliability of meta data is important, meta data is programmed in the meta area having high reliability. Controller write data excluding the meta data is programmed in the user area. That is, sequential data, random data, garbage data and LSB data are programmed in the user area.

According to the program area allocation method of embodiments of the inventive concept, specific attribute data among controller write data being programmed in the user area is alternately programmed in the meta area and the user area. The specific attribute data may be differently set according to a user environment of a storage device. In FIG. 6, LSB backup data is selectively programmed in the meta area and the user area according to a wear out ratio (WOR). For example, if a wear out ratio of the meta area is smaller than a wear out ratio of the user area, the memory controller 120 (refer to FIG. 1) may program LSB backup data in the meta area (operation ①). If a wear out ratio of the meta area is equal to or greater than a wear out ratio of the user area, the memory controller 120 (refer to FIG. 1) may program LSB backup data in the user area (operation ②).

By selecting controller write data having high frequency of use and high amount of use as the specific attribute data to be programmed alternately in the meta area and the user area as described with respect to FIG. 6 for example, the lifespan of the nonvolatile memory device 130 may be further improved.

Figure 7:
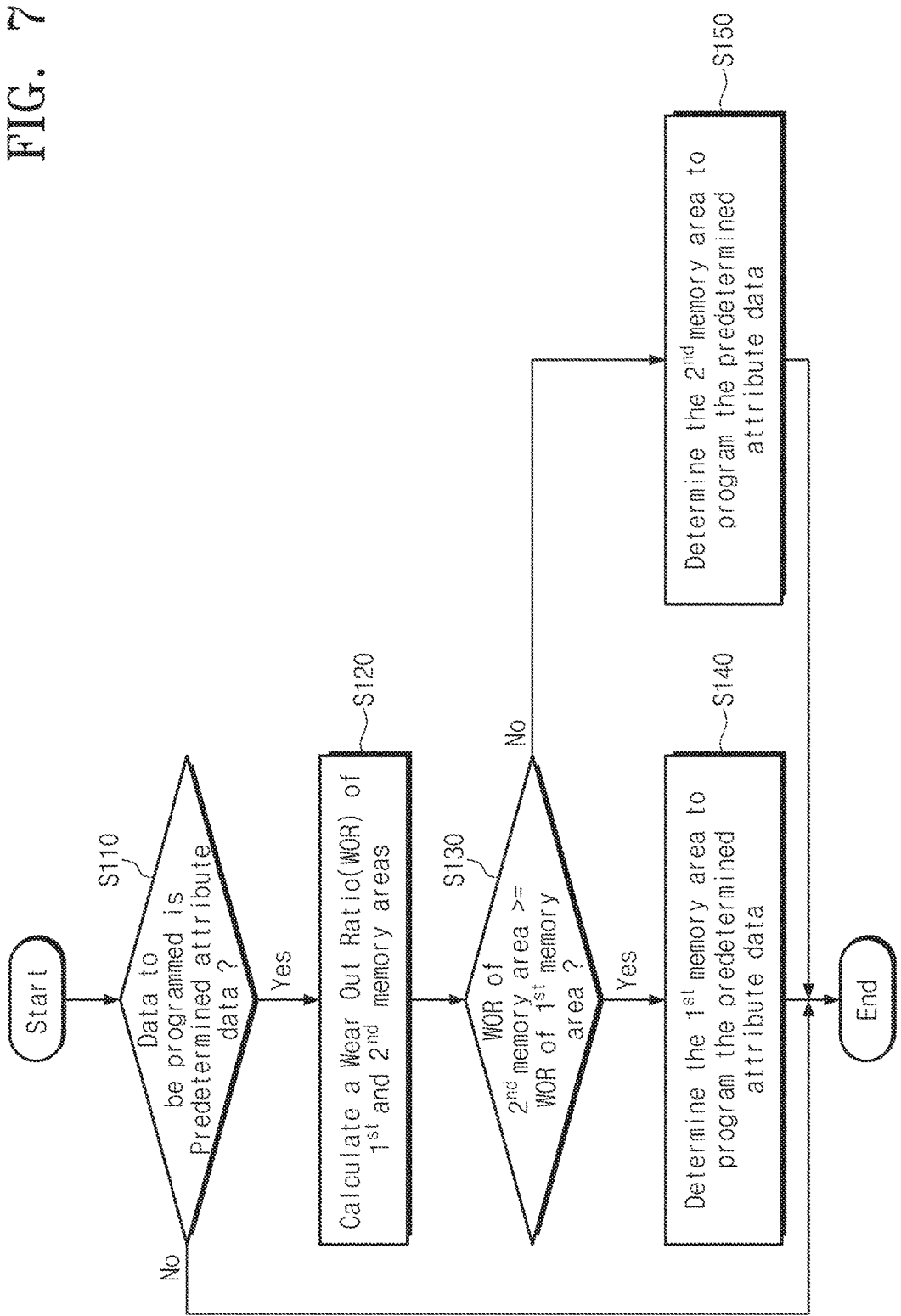
FIG. 7 is a flowchart illustrating a program area allocation method, according to an embodiment of the inventive concept.

FIG. 7 is a flowchart illustrating a program area allocation method, according to an embodiment of the inventive concept. Referring to FIG. 7, the program area allocation method determines a memory area in which specific attribute data is programmed according to a wear out ratio of each memory area.

In step S110, the memory controller 120 (refer to FIG.1) checks whether data to be programmed is specific attribute data. The specific attribute data to be alternatively programmed in each memory area according to a wear out ratio may be data previously set depending on a use environment. The specific attribute data may be set by software update of the flash translation layer 320 (refer to FIG. 4). In the case that data to be programmed is the specific attribute data set, the flash translation layer 320 driven in the memory controller 120 begins an overall control operation for the program area allocation operation according to embodiments of the inventive concept. In the case that data to be programmed is not the specific attribute data set, the program area allocation operation ends. In this case, the data to be programmed may be programmed in a memory area previously set, such as, the second memory area or the user area.

In step S120, the flash translation layer 320 calculates a wear out ratio of each memory area. The flash translation layer 320 calculates a wear out ratio (WOR) according to the formula described above using the current maximum erase count of memory blocks constituting each memory area and the allowable maximum erase count of a corresponding memory area. The calculated wear out ratio can be used to compare the remaining lifespan of each memory area having different maximum allowable erase count based on the same criterion. For example, assuming that in the case of the first memory area being managed using an SLC method, the allowable maximum erase count may be 1000, and in the case of the second memory area being managed using an MLC method, the allowable maximum erase count may be 100. In this case, to reduce the lifespan of the first memory area by 10%, the erase count of memory blocks that belong to the first memory area has to increase by 100 times. However, to reduce the lifespan of the second memory area by 10%, the erase count of memory blocks that belong to the second memory area has only to increase 10 times. Thus, although the erase count of memory blocks of the first memory area and the second memory area in this case equally increases by 10%, an effect on the lifespan of each memory area is different. The wear out ratio according to embodiments of the inventive concept compares the remaining lifespan based on the same criterion to compensate for the difference.

In step S130, the flash translation layer 320 compares a calculated wear out ratio of each memory area. The flash translation layer 320 determines a memory area in which specific attribute data is programmed according to a comparison result. If a wear out ratio with respect to the second memory 334 (refer to FIG. 4) is greater than or equal to a wear out ratio with respect to the first memory 332, flow proceeds to a step S140. If a wear out ratio with respect to the second memory 334 (refer to FIG. 4) is smaller than a wear out ratio with respect to the first memory 332, flow proceeds to a step S150.

In step S140, the flash translation layer 320 determines the first memory area 332 as a memory area in which the specific attribute data will be programmed. A wear out ratio is a ratio of the maximum erase count of memory blocks of a memory area with respect to the allowable maximum erase count of the memory area. Accordingly, a relatively high wear out ratio is indicative that the erase count of the specific memory block of the memory area is close to the allowable maximum erase count. That is, the remaining lifespan of the specific memory block is small. Thus, the flash translation layer 320 determines a memory area so that the specific attribute data is programmed in a memory area having a relative small wear out ratio.

In step S150, the flash translation layer 320 determines the second memory area 334 as a memory area in which the specific attribute data is programmed.

The program area allocation operation according to embodiments of the inventive concept ends subsequent to determining a memory area in which the specific attribute data will be programmed by the flash translation layer 320. Thereafter, the memory controller 120 programs the specific attribute data in any one of memory blocks of the memory area determined in step S140 or step S150.

In the program area allocation operation according to embodiments of the inventive concept, a memory area to be programmed is determined with reference to a wear out ratio. By considering a wear out ratio, a memory area in which the specific attribute data will be programmed may be determined, considering the remaining lifespan of each memory area. Thus, the lifespan of the first and second memory areas 332 and 334 may expire at nearly the same time. Consequently, the lifespan of a storage device is improved.

Figure 8A:
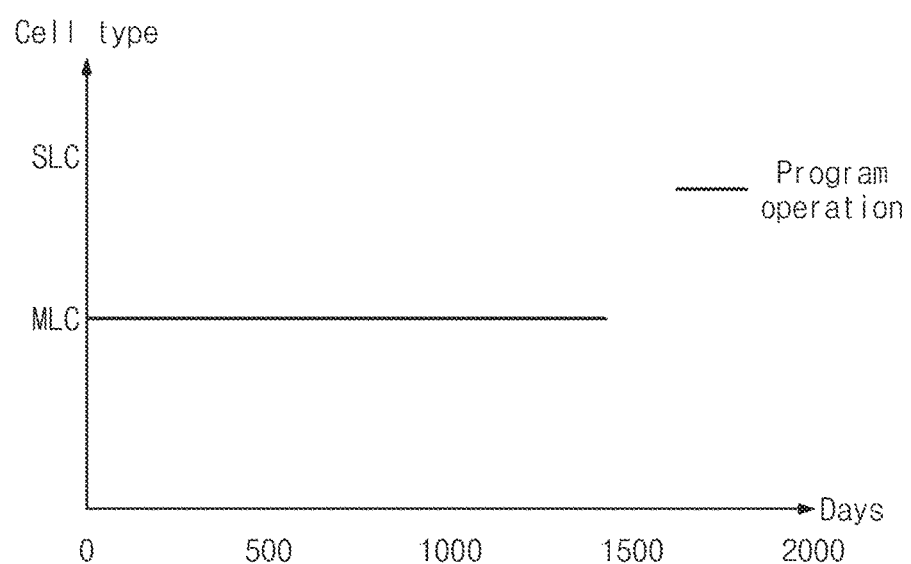
FIGS. 8A and 8B are graphs comparing a program operation using a program area allocation method according to an embodiment of the inventive concept, and a program operation that does not use a program area allocation method of the inventive concept.
Figure 8B:
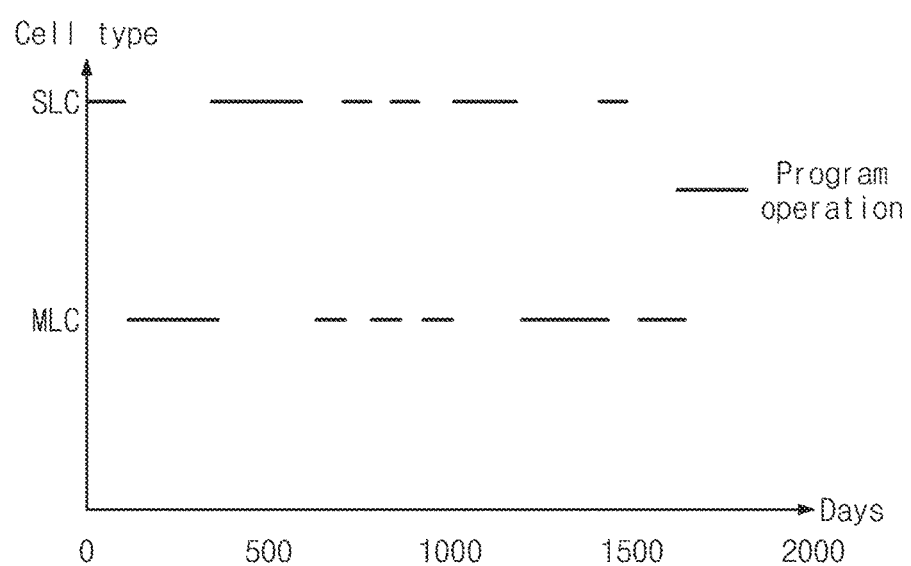

FIGS. 8A and 8B are graphs comparing a program operation using a program area allocation method according to an embodiment of the inventive concept, and a program operation that does not use a program area allocation method of the inventive concept. FIGS. 8A and 8B illustrate a program operation of any same one data among controller write data.

In particular, FIG. 8A is a graph illustrating a program operation that does not use the program area allocation method of the inventive concept. In this case, the specific attribute data is programmed only in a memory area previously set, such as a memory area managed using an MLC method. Generally, the lifespan of memory cells managed using an MLC method is shorter than the lifespan of memory cells managed using an SLC method. Thus, if the specific attribute data is continuously programmed only in memory cells managed using an MLC method, the memory area managed using the MLC method comparatively rapidly reaches the limited lifespan. In this case, the lifespan of the memory area managed using the SLC method is long enough, but the lifespan of the memory area managed using the MLC method expires and thereby the lifespan of the storage device as a whole will expire.

FIG. 8B is a graph illustrating a program operation using the program area allocation method according to an embodiment of the inventive concept. Referring to FIG. 8B, it can be understood that the specific attribute data is alternately programmed in the memory area managed using the SLC method and the memory area managed using the MLC method. In a program operation of the specific attribute data, the memory controller 120 calculates a wear out ratio of each memory area. After that, the memory controller 120 compares the calculated wear out ratio to determine a memory area in which the specific attribute data will be programmed. That is, the memory controller 120 can compare the remaining lifespan of each memory area based on the same criterion through the calculated value which is the wear out ratio, and determine a memory area in which the specific attribute data will be programmed according to the comparison result. In the case that a wear out ratio of the memory area managed using the SLC method is greater than a wear out ratio of the memory area managed using the MLC method, the memory controller 120 can program the specific attribute data in the memory area managed using the MLC method. The specific attribute data may be alternately programmed in the memory area managed using the SLC method and the memory area managed using the MLC method, depending on the comparison result of a wear out ratio of each memory area.

Figure 9:
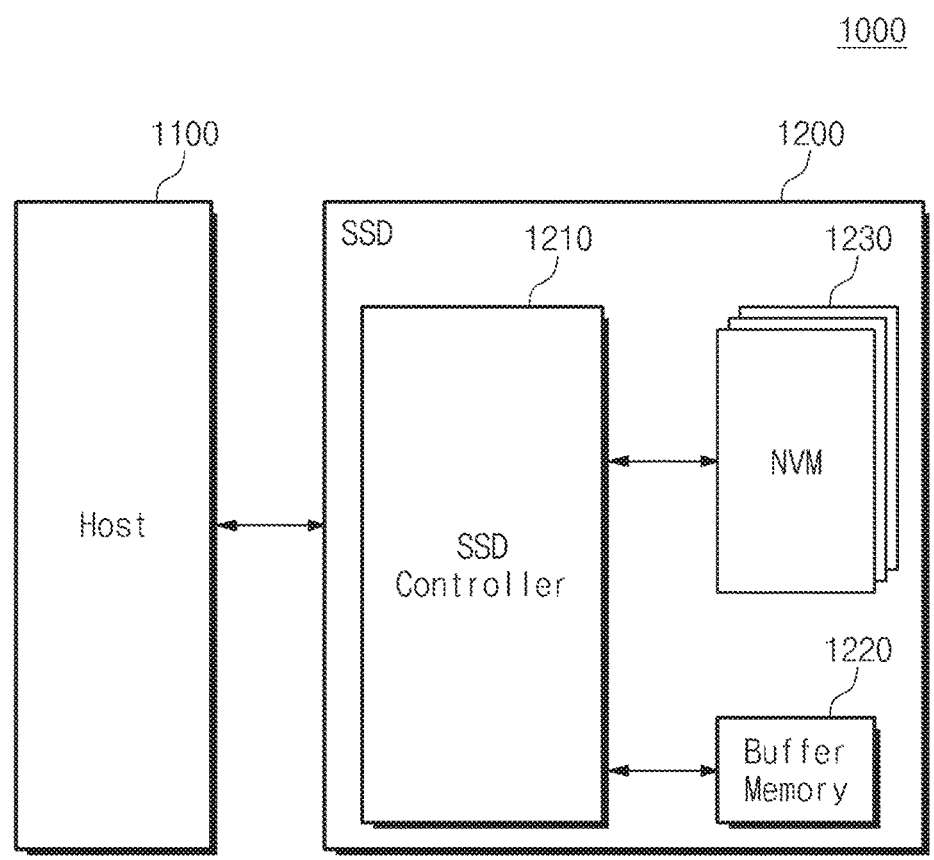
FIG. 9 is a block diagram illustrating a user device including a solid state disk (SSD), according to embodiments of the inventive concept.

FIG. 9 is a block diagram illustrating a user device including a solid state disk (SSD), according to embodiments of the inventive concept. Referring to FIG. 9, a user device 1000 includes a host 1100 and an SSD 1200. The SSD 1200 includes an SSD controller 1210, a buffer memory 1220 and a nonvolatile memory device 1230.

The SSD controller 1210 provides a physical connection between the host 1100 and the SSD 1200. That is, the SSD controller 1210 provides interfacing with the SSD 1200 in response to a bus format of the host 1100. The SSD controller 1210 decodes a command provided from the host 1100. According to the decoded result, the SSD controller 1210 accesses the nonvolatile memory device 1230. The bus format of the host 1100 may include a universal serial bus (USB), a small computer small interface (SCSI), a PCI-express (PCI-E), an advanced technology attachment (ATA), a parallel-ATA (PATA), a serial-ATA (SATA), a serial attached SCSI (SAS), or the like The buffer memory 1220 temporarily stores write data provided from the host 1100 or data read from the nonvolatile memory device 1230. In the case that data that exists in the nonvolatile memory device 1230 is cached when a read request of the host 1100 occurs, the buffer memory 1220 supports a cache function of directly providing the cached data to the host 1100. A data transmission speed by the bus format of the host 1100 (for example, SATA or SAS) is much higher compared with a transmission speed of a memory channel of the SSD 1200. That is, in the case that an interface speed of the host 1100 is high, performance degradation that occurs due to a speed difference may be minimized by providing the large capacity buffer memory 1220.

The buffer memory 1220 may be provided as a synchronous DRAM (SDRAM) to provide sufficient buffering in the SSD 1200 used as a large capacity auxiliary memory device. However, it should be apparent to those of ordinary skill in the art that the buffer memory 1220 is not limited thereto.

The nonvolatile memory device 1230 is provided as a storage medium of the SSD 1200. For example, the nonvolatile memory device 1230 may be provided as a NAND flash memory having large-capacity storage ability. The nonvolatile memory device 1230 may be constituted by a plurality of memory devices. In this case, each memory device is connected to the SSD controller 1210 by a channel unit. In embodiments of the inventive concept the storage medium of SSD 1200 may be NAND flash memory as described, but is not limited to NAND flash memory. For example, PRAM, MRAM, ReRAM, FRAM, NOR flash memory, or the like may be used as a storage medium, and a memory system in which different kinds of memory devices are mixed may be used as the storage medium. The nonvolatile memory device 1230 may include a first memory area and a second memory area that are managed using different methods from each other. The first memory area may be managed using an SLC method and the second memory area may be managed using an MLC method.

The SSD controller 1210 programs specific attribute data in the nonvolatile memory device 1230. The SSD controller 1210 determines a memory area in which the specific attribute data will be programmed according to the comparison result of the wear out ratio described above. That is, the SSD controller 1210 calculates wear out ratios of the first and second memory areas to determine a memory area in which the specific attribute data will be programmed by comparing the calculated wear out ratios. Thus, the specific attribute data may be alternately programmed in the first and second memory areas depending on a comparison result. In the case of using the program area allocation method according to an embodiment of the inventive concept, the lifespan of the nonvolatile memory device 1230 may increase.

Figure 10:
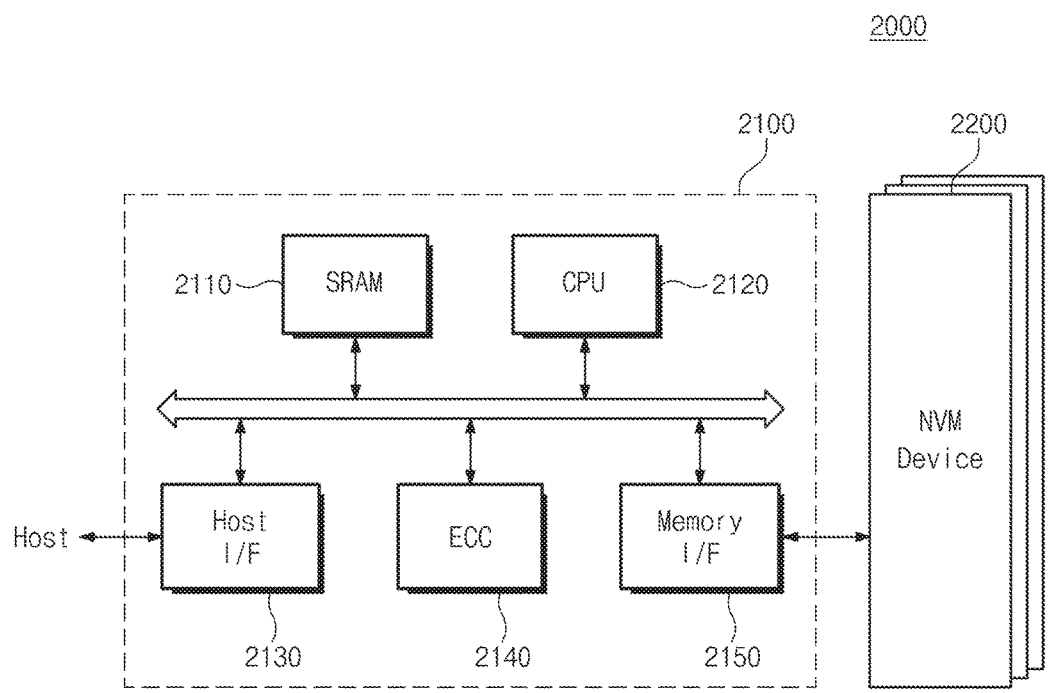
FIG. 10 is a block diagram illustrating a storage device, according to embodiments of the inventive concept.

FIG. 10 is a block diagram illustrating a storage device, according to embodiments of the inventive concept. Referring to FIG. 10, the storage device 2000 includes a memory controller 2100 and a nonvolatile memory device 2200.

The nonvolatile memory device 2200 may be configured the same as any one of the nonvolatile memory devices 130, 240 and 330 of FIGS. 1, 3 and 4. Thus, a detailed description of the nonvolatile memory device 2200 will be omitted.

The memory controller 2100 may be configured to control the nonvolatile memory device 2200. The SRAM 2110 may be used as a working memory of CPU 2120. The host interface 2130 may include data exchange protocols of a host connected to the storage device 2000. An error correction circuit (ECC) 2140 included in the memory controller 2100 detects and corrects an error included in data read from the nonvolatile memory device 2200. A memory interface 2150 interfaces with the nonvolatile memory device 2200. A CPU (central processing unit) 2120 performs an overall control operation for data exchange of the memory controller 2100. Although not illustrated in the drawing, the storage device 2000 may further include a ROM (not illustrated) storing code data for an interfacing with the host.

The memory controller 2100 may be configured to communicate with the outside (for example, the host) through one of various interface protocols such as USB, multi media card (MMC), PCI-E, SATA, PATA, SCSI, enhanced small disk interface (ESDI) and integrated drive electronics (IDE).

The storage device 2000 may be applied to a computer, an ultra mobile PC (UMPC), a workstation, a net-book, a personal digital assistants (PDA), a portable computer, a web tablet, a wireless phone, a mobile phone, a smart phone, a digital camera, a digital audio recorder, a digital audio player, a digital picture recorder, a digital picture player, a digital video recorder, a digital video player, a device that can transmit and receive information in a wireless environment, and one of various electronic devices constituting a home network.

The memory controller 2100 may program controller write data in the nonvolatile memory device 2200. The controller 2100 determines a memory area in which specific attribute data will be programmed according to the comparison result of the wear out ratio described above. That is, the memory controller 2100 calculates wear out ratios of a first memory area and a second memory area within nonvolatile memory device 2200 and compares the calculated values to determine the memory area in which specific attribute data will be programmed. Thus, the specific attribute data may be alternately programmed in the first and second memory areas according to the comparison result. In the case of using the program area allocation method according to embodiments of the inventive concept, the lifespan of the nonvolatile memory device 2200 may increase.

Figure 11:
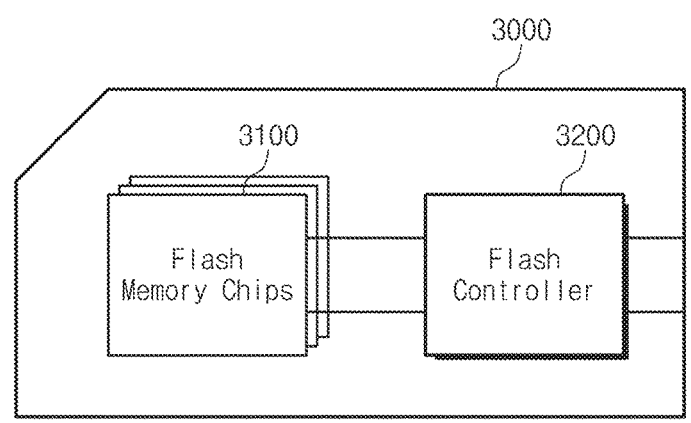
FIG. 11 is a block diagram illustrating a data storage device, according to embodiments of the inventive concept.

FIG. 11 is a block diagram illustrating a data storage device, according to embodiments of the inventive concept. Referring to FIG. 11, the data storage device 3000 includes flash memory chips 3100 and a flash controller 3200. The flash controller 3200 controls the flash memory chips 3100 based on control signals received from the outside.

The flash memory chips 3100 may be configured the same as any one of the nonvolatile memory devices 130, 240 and 330 of FIGS. 1, 3 and 4 and may be configured by multichip. Each of the flash memory chips 3100 may be constituted by any one of a stack flash structure in which arrays are stacked with multilayer, a flash structure having no source-drain, a pin-type flash structure and a three dimensional flash structure.

The data storage device 3000 may constitute a memory card device, a SSD device, a multimedia card device, a SD device, a memory stick device, a hard disk drive device, a hybrid drive device, or a general purpose serial bus flash device. For example, the data storage device 3000 can constitute a card satisfying an industrial standard for using a user device such as a digital camera, a personal computer, or the like.

The flash controller 3200 may program controller write data in the flash memory chips 3100. The flash controller 3200 determines a memory area in which specific attribute data will be programmed according to the comparison result of the wear out ratio described above. That is, the flash controller 3200 calculates wear out ratios of the first memory area and the second memory area within the flash memory chips 3100 and compares the calculated values to determine the memory area in which specific attribute data will be programmed. Thus, the specific attribute data may be alternately programmed in the first and second memory areas according to the comparison result. In the case of using the program area allocation method according to embodiments of the inventive concept, the lifespan of the flash memory chips 3100 may increase.

Figure 12:
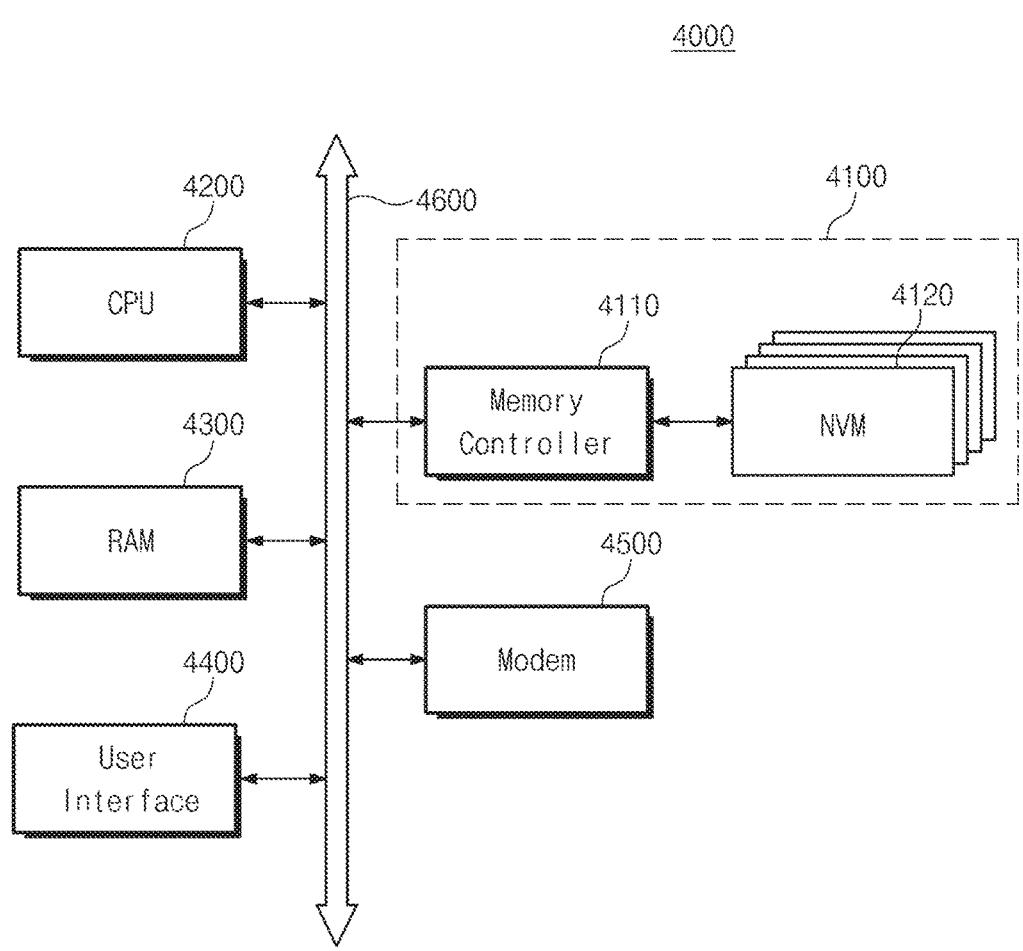
FIG. 12 is a block diagram illustrating a storage device according to embodiments of the inventive concept, and a computing system including the storage device.

FIG. 12 is a block diagram illustrating a storage device according to embodiments of the inventive concept, and a computing system including the storage device. Referring to FIG. 12, the computing system 4000 includes the storage device 4100, a CPU (central processing unit) 4200, a RAM 4300, a user interface 4400, and a modem 4500 such as a baseband chipset, interconnected by bus 4600.

The storage device 4100 may be configured to be the same as the storage device illustrated in FIG.1. A nonvolatile memory device 4120 is a flash memory and may be constituted by any one of a stack flash structure in which arrays are stacked with multilayer, a flash structure having no source-drain, a pin-type flash structure and a three dimensional flash structure.

In the case that the computing system 4000 is a mobile device, a battery for supplying an operation voltage of the computing system 4000 may be further provided. Although not illustrated in the drawing, the computing system 4000 may further include an application chipset, a camera image processor (CIS), a mobile DRAM, or the like. A memory controller 4110 and the nonvolatile memory device 4120 may constitute a SSD (solid state drive) using a nonvolatile memory when storing data.

The nonvolatile memory device and/or the memory controller according to embodiments of the inventive concept may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

According to embodiments of the inventive concept, the storage device alternately programs specific data in a plurality of memory areas, so that the lifespan of the memory areas expires at nearly the same time and thereby the lifespan of the storage device may be improved.

The foregoing is illustrative of the inventive concept and is not to be construed as limiting thereof. Although a few embodiments of the inventive concept have been described, those skilled in the art will readily appreciate that many modifications of the embodiments are possible without materially departing from the novel teachings and advantages of the inventive concept. Accordingly, all such modifications are intended to be included within the scope of the inventive concept as defined in the claims. The inventive concept is defined by the following claims, with equivalents of the claims to be included therein.

What is claimed is:

1. A storage device comprising:
a nonvolatile memory device comprising memory blocks divided into a single level cell (SLC) area and a multi-level cell (MLC) area; and
a memory controller configured to interface between a host and the nonvolatile memory device, and program meta data in the SLC memory area, the meta data generated by the memory controller,
the memory controller comprising
a program area determinator configured to determine the SLC area as a location to program specific attribute data having different properties when a wear out ratio of the SLC memory area is less than a wear out ratio of the MLC memory area, and determine the MLC area as the location to program the specific attribute data when the wear out ratio of the SLC memory area is greater than the wear out ratio of the MLC memory area,
wherein the wear out ratio of the SLC area is a ratio of a current maximum erase count of memory blocks of the SLC area with respect to an allowable maximum erase count of the SLC area, and the wear out ratio of the MLC area is a ratio of a current maximum erase count of memory blocks of the MLC area with respect to an allowable maximum erase count of the MLC area,
wherein the specific attribute data is alternately programmed in the SLC area and the MLC area according to an area from among the SLC area and the MLC area determined by the program area determinator, and
wherein the specific attribute data is one of sequential data, random data, garbage collection data and least significant bit (LSB) backup data, which is originally provided from the host.

2. A program method of a nonvolatile memory device including memory blocks including a meta area and a user area, the program method comprising:
programming meta data into the meta area;
calculating a wear out ratio of the meta area and a wear out ratio of the user area;
determining an area among the meta area and the user area in which to program specific attribute data according to the calculated wear out ratios of the meta area and the user area; and
programming the specific attribute data into the meta area when the wear out ratio of the meta area is less than the wear out ratio of the user area, and programming the specific attribute data into the user area when the wear out ratio of the meta area is greater than the wear out ratio of the user area,
wherein the wear out ratio of the meta area is a ratio of a current maximum erase count of memory blocks of the meta area with respect to an allowable maximum erase count of the meta area, and the wear out ratio of the user area is a ratio of a current maximum erase count of memory blocks of the user area with respect to an allowable maximum erase count of the user area, and
wherein the specific attribute data is originally provided from a host and the meta data is created by a memory controller.

3. The program method of claim 2, wherein the user data is alternately programmed in the meta area and the user area according to the wear out ratio of the meta area and the wear out ratio of the user area.

4. The program method of claim 2, wherein specific attribute data different from each other is programmed in the meta area and the user area.

5. The program method of claim 4, wherein data programmed in the meta area and the user area comprises the meta data, sequential data, random data, garbage collection data and least significant bit (LSB) backup data.

6. The program method of claim 5, wherein the meta data is programmed in the meta area, and the sequential data, the random data, the garbage collection data and the LSB backup data are programmed in the user area.

7. The program method of claim 6, wherein the specific attribute data is one of the sequential data, the random data, the garbage collection data and the LSB backup data programmed in the user area.

8. A storage device comprising:
a nonvolatile memory device comprising memory blocks including first and second memory areas; and
a memory controller configured to count erase operations performed to determine erase counts of the memory blocks, calculate a wear out ratio of the first memory area and a wear out ratio of the second memory area based on the erase counts, and alternately program specific attribute data in the first and second memory areas based on the calculated wear out ratios,
wherein a specific attribute data is programmed into the first memory area when the wear out ratio of the first memory area is less than the wear out ratio of the second memory area, and the specific attribute data is programmed into the second memory area when the wear out ratio of the first memory area is greater than the wear out ratio of the second memory area.

9. The storage device of claim 8, wherein the wear out ratio of the first memory area is a ratio of a current maximum erase count of memory blocks of the first memory area with respect to an allowable maximum erase count of the first memory area, and the wear out ratio of the second memory area is a ratio of a current maximum erase count of memory blocks of the second memory area with respect to an allowable maximum erase count of the second memory area.

10. The storage device of claim 8, wherein the memory controller is configured to store meta data in the first memory area, and sequential data, random data, garbage collection data and least significant bit (LSB) data in the second memory area.

11. The storage device of claim 10, wherein the specific attribute data comprises any one of the sequential data, the random data, the garbage collection data and the LSB data.

12. The storage device of claim 8, wherein the memory controller is configured to manage the first memory area using a single level cell method and to manage the second memory area using a multi level cell method.

* * * * *